Oct. 23, 1923.

B. D. KUNKLE 1,471,741

SWITCH MECHANISM FOR AUTOMOBILES

Original Filed April 5, 1917

WITNESSES:
R. J. Fitzgerald

INVENTOR
Bayard D. Kunkle.
BY
J. R. Langley
ATTORNEY

Patented Oct. 23, 1923.

1,471,741

UNITED STATES PATENT OFFICE.

BAYARD D. KUNKLE, OF SPRINGFIELD, MASSACHUSETTS, ASSIGNOR TO THE CASKEY-DUPREE MANUFACTURING COMPANY, A CORPORATION OF OHIO.

SWITCH MECHANISM FOR AUTOMOBILES.

Application filed April 5, 1917, Serial No. 159,897. Renewed July 19, 1922. Serial No. 576,158.

*To all whom it may concern:*

Be it known that I, BAYARD D. KUNKLE, a citizen of the United States, and a resident of Springfield, in the county of Hampden and State of Massachusetts, have invented a new and useful Improvement in Switch Mechanisms for Automobiles, of which the following is a specification.

My invention relates to switch mechanisms for automobiles and particularly to such switches as are employed for controlling the lighting circuits and ignition circuits of motor vehicles.

My invention has for one of its objects to provide a unitary mechanism having a single actuating member for controlling a plurality of electrical circuits.

A second object of my invention is to provide a mechanism of the character indicated above that is simple in operation, economical in space, and is arranged to be located at a point convenient for actuation by the operator.

A switch arranged in accordance with my invention may be secured either to the steering column or to the dashboard of an automobile or other motor vehicle in connection with which it may be employed. A single actuating member operates to control both the lighting circuits of the vehicle and the ignition circuit for the driving engine.

The switch constituting the subject matter of the present application is somewhat similar in principle to the switch shown and described in my copending application Serial No. 123,515, filed October 3, 1916, upon which the present arrangement is an improvement.

The switch consists essentially of an actuating member having a longitudinal movement for controlling one of the above-named electrical circuits and a rotative movement for controlling the other circuit. The mechanism is so arranged that the operation of the actuating member to effect the opening or closing of one of the circuits does not alter the position of the movable contact members for controlling the other circuit. The connections of the ignition circuit are reversed upon each successive movement of the actuating member to render the ignition mechanism operative.

Figure 1:
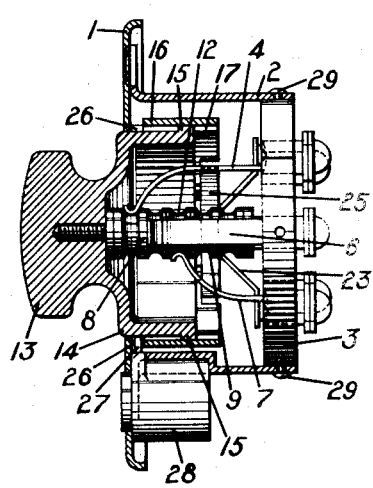
Figure 2:
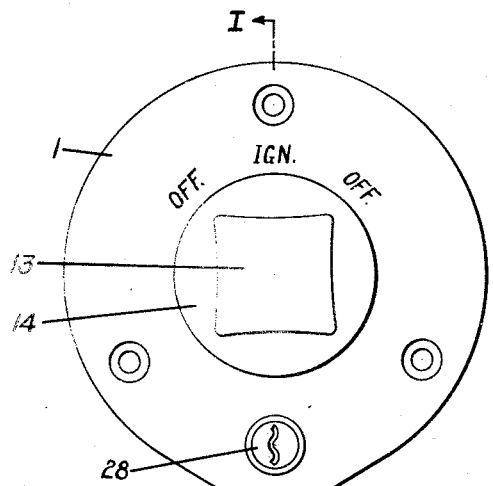
Figure 3:
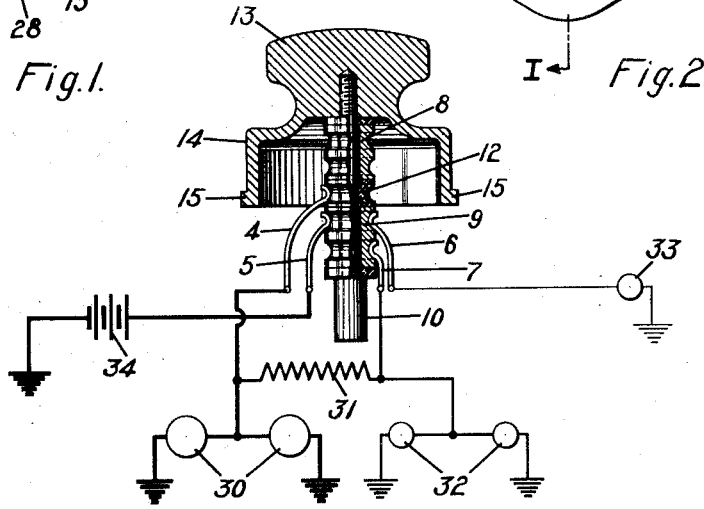
Figure 4:
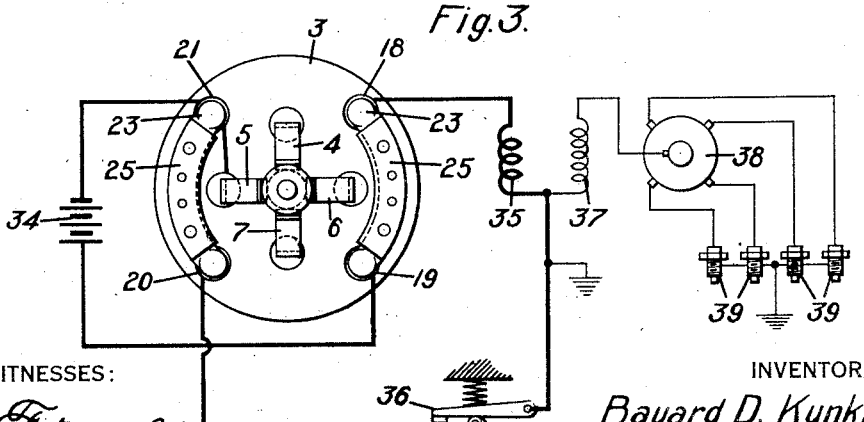

My invention will be described in connection with the accompanying drawing, in which Fig. 1 is a side view in section on line I—I of Fig. 2, of a switch constructed in accordance with my invention. Fig. 2 is a front view in elevation of the mechanism of Fig. 1. Fig. 3 is a sectional view of the actuating member, the lighting circuits of a motor vehicle being shown diagrammatically in connection therewith. Fig. 4 is a plan view of the circuit-controlling mechanisms, the ignition circuits of a motor vehicle being illustrated diagrammatically in proper relation thereto, the actuating member being removed.

A switch for controlling the lighting and the ignition circuits of an automobile is provided with a front cover member 1 by means of which it may be secured, for example, to the dashboard of the vehicle. The switch comprises a cylindrical casing member 2 and a base member 3 of insulating material that is secured to the casing.

The base member supports four resilient contact fingers 4, 5, 6 and 7 which have terminal members extending through the base member. The contact fingers 4 and 7 are respectively longer and shorter than the contact fingers 5 and 6, which are of equal length. The contact fingers coact with movable bridging members 8 and 9 which are carried by, and insulated from, a longitudinally movable rod 10.

The bridging members, which are of substantially cylindrical shape, are provided with annular grooves which are engaged by curved portions of the contact fingers to accentuate the respective operative positions of the rod 10 and its connected parts. A member 12 of insulating material, which is similar in size and in shape to the bridging members, is mounted on the rod 10 between the bridging members 8 and 9. The function of the insulating member 12 is to effect the opening of such circuits as correspond to the contact members that are in engagement with it and to insulate the contact members 8 and 9 from each other.

The rod 10 is connected to an actuating knob 13 which is substantially square in cross section. The knob 13 is integral with a member 14 of ring shape which is provided with diametrically opposite projecting portions 15. The ring 14 is surrounded by a second ring 16 having grooves 17 into which the projections 15 extend. This arrangement provides that the ring 16 is rotatable with the ring 14 and the knob 13 but the latter parts may be actuated longitudinally without affecting the position of the ring 16. The ring 14 is slidable within a central opening in the cover member 1 and the rod 10 is slidable in an opening in the base member 3.

The base member 3 is provided also with four stationary contact members 18, 19, 20 and 21 which are arranged at points equidistinct from the center of the base member and from each other. The contact members 18, 19, 20 and 21, which have terminal members extending through the base member 3, have concave surfaces for coacting with the convex surfaces of a pair of movable contact members or bridging members 23.

The bridging members 23, which are of resilient conducting material, are of approximately U-shape, the leg portions inclining outwardly. The bridging members 23 are respectively connected to curved segments 25 of insulating material that are rigidly secured to the ring 16 at diametrically opposite points. The rotation of the knob 13 accordingly actuates the bridging members to connect different pairs of the contact members 18, 19, 20 and 21. The commutating device just described constitutes the mechanism for reversing the direction of the current traversing the ignition circuit.

The ring 16 is provided with a series of notches 26, two of which appear in Fig. 1, for engagement by the movable member 27 of a lock 28 when the knob 13 occupies an inoperative position with respect to the ignition system. The lock 28 may be of any suitable type, such, for example, as a permutation lock or a lock controlled by a key. A lock of the latter type is illustrated by way of example.

The switch may be easily and conveniently assembled or the several parts may be quickly removed for inspection and repair. The casing 2 is secured to the cover member by spot welding or other suitable means. The base member 3 with the several contact members and contact fingers carried by it is assembled with the rings 14 and 16 and their connected parts before inserting them in the casing. The switch mechanism is then inserted as a unit through the rear of the casing and the base member is secured to the latter by means of screws 29. The removal of the screws 29 permits the removal of the entire switch mechanism as a unit.

The contacting ends of the contact springs 4, 5, 6, 7 engage the grooves in the side of the turning member of the switch, these interengaging formations serving to hold this turning member in assembly with the contact carrying base 3 of the switch structure.

Reference may now be had to Fig. 3 in which the lighting circuits of an automobile are diagrammatically illustrated. The headlights 30 are connected in parallel to the contact finger 4 and through a dimming resistor 31 to the contact finger 7. The side lights 32 are similarly connected to the contact finger 7. The tail light 33 is connected to the contact finger 6. A battery 34, which may be the usual storage battery carried by automobiles, is connected to the contact finger 5.

Referring particularly to Fig. 4, the circuits and apparatus of an ignition system are shown in connection with the mechanism for controlling them. The primary circuit comprises the battery 34, contact members 18, 19, 20 and 21, bridging members 23, the primary winding 35 of an induction coil and an interrupter 36. The secondary circuit comprises the secondary winding 37 of the induction coil, a distributer 38 and the usual spark plugs 39.

It may be assumed that the knob 13 occupies its respective inoperative longitudinal and angular positions. Fig. 2 represents the latter position of the knob. The contact finger 5, which is connected to the battery, is in engagement with the insulating member 12 and all of the lighting circuits are, accordingly, open. The knob 13 occupies an "off" position in which the bridging members 23 occupy positions 45° from those in which they are illustrated in Fig. 4. The ignition system is inoperative since the primary circuit is open at the several contact members 18, 19, 20 and 21.

To start the engine of the vehicle in connection with which the circuits and apparatus are employed, the knob 13 is rotated in either direction from its illustrated position (Fig. 2) through an angle of 45°. The bridging members 23 then connect the contact members 18, 19, 20 and 21 in pairs.

Assuming that the several contact members occupy the respective positions in which they are illustrated, Fig. 4, the primary circuit extends from the battery 34 through contact member 19, bridging member 23, contact member 18, primary coil 35, interrupter 36, contact member 20, bridging member 23 and contact member 21 to the battery.

To stop the engine, the knob 13 is rotated through an angle of 45° to actuate the bridging members to positions intermediate the stationary contact members and thereby open the ignition circuit traced above. The corners of the knob 13 serve as pointers to indicate the "on" and "off" positions.

While the knob 13 may be turned in either direction through the proper angle to effect the results described above, it is preferably rotated in a single direction in order that it will operate to reverse the current through the interrupter contact members upon succeeding starting operations. When the knob has been actuated successively to "off" and "on" positions, the bridging members 23 occupy positions displaced 90° from those in which they are illustrated, Fig. 4. The respective pairs of contact members 18 and 21 and 19 and 20 are then connected and the connections of the interrupter are reversed.

When the knob 13 is actuated to its inner position in which it is illustrated, Fig. 1, the contact fingers 4, 5 and 6 engage bridging member to complete the circuits of the headlights 30 and the tail light 33. The contact finger 7 engages the insulating member 12 and the circuits of the side lamps 32 are open. This position corresponds to normal running conditions when it is desirable to employ the full power of the headlights.

It is often desirable to dim the headlights when operating within cities or when passing other vehicles. To accomplish this result, it is only necessary to pull the knob outwardly with a quick movement. The several contact fingers and associated parts then occupy the relative positions shown in Fig. 3. The headlights 30 are connected to the battery only through the dimming resistor 31 and the contact finger 7. The side lamps 32 and the tail lamp 33 are lighted.

Since the lamps are used only at night, the advantages of a switching mechanism which may be operated for controlling them without requiring that the operator interrupt his view of the road will be appreciated by those having experience in the operation of automobiles. It is only necessary to actuate the knob to the respective limits of its movement to dim the headlights or to connect them directly in circuit. The knob may readily be adjusted to its intermediate position to turn off the lights since the vehicle is always at rest when this is done.

It will be noted that, in the operation of the switch mechanism, the actuation of the knob to control the circuits of one of the systems does not, in any way, affect the circuits of the other. The sliding connection of the concentric rings provides for longitudinal movements of the knob to control the lighting circuits without disturbing the ignition circuits. The cylindrical shape of the bridging members carried by the knob permits rotative movements of the latter without disturbing the lighting circuits.

A switch constructed in accordance with my invention possesses a number of important advantages. The parts are simple in construction and few in number. A single actuating member controls both the lighting and the ignition systems. The switch may be assembled or the parts may be removed with a minimum amount of labor. The switch may be actuated as desired without diverting the attention of the operator from the steering of the car.

I claim as my invention:

1. In a switching mechanism, the combination with a rotatable switching mechanism and a reciprocable switching mechanism having a plurality of operative positions, said reciprocable mechanism having an intermediate inoperative position, of a single member rigidly connected to said reciprocable mechanism for actuating said mechanisms independently of each other.

2. In a switching mechanism, the combination with a mechanism comprising a plurality of contact members arranged in a circle and a plurality of relatively rotatable contact elements for connecting said contact members in a plurality of arrangements of pairs according to relative positions and a plurality of relatively reciprocable contact members, of a single member for actuating said rotatable contact elements independently of said reciprocable contact members regardless of their positions and for actuating said contact members independently of said contact elements.

3. In a switching mechanism, the combination with a plurality of alined members of substantially cylindrical shape, a plurality of contact fingers for engaging said members, and a member for actuating said members longitudinally, of a plurality of stationary contact members, a plurality of bridging members for connecting said stationary contact members in pairs and means for connecting said bridging members to said actuating member for rotation therewith but permitting longitudinal movements relatively thereto.

4. In a switch mechanism, the combination with a plurality of stationary contact members and a plurality of longitudinally movable contact members coacting therewith, of a mechanism comprising a plurality of stationary contact members, a plurality of coacting bridging members, a rotatable member for carrying said bridging members and an actuating member rigidly connected to said movable contact members and longitudinally movable relatively to said rotatable member but rotatable therewith.

5. In a switching mechanism, the combination with a rotatable switching mechanism having a plurality of operative and inoperative positions alternately and separated by substantially 45°, of a dial arranged to designate a portion only of such positions, and an actuating member having four angular portions for indicating on said dial the condition of the circuit controlled by the mechanism in any position of the latter.

6. In a switching mechanism, the combination with an actuating knob, a hollow cylindrical member integral therewith and a second hollow cylindrical member concentric with the first named member and slidably connected thereto for rotation therewith, of a switch member connected to said second member, a second switch member rigidly connected to said actuating knob, and a base member for supporting contact members for coacting with the respective switch members.

In testimony whereof, I have hereunto subscribed my name this ninth day of March, 1917.

BAYARD D. KUNKLE.